United States Patent
Twelves, Jr.

(10) Patent No.: US 9,052,016 B2
(45) Date of Patent: Jun. 9, 2015

(54) VARIABLE WIDTH GAP SEAL

(75) Inventor: Wendell V. Twelves, Jr., Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 26 days.

(21) Appl. No.: 13/279,423

(22) Filed: Oct. 24, 2011

(65) Prior Publication Data

US 2013/0099453 A1    Apr. 25, 2013

(51) Int. Cl.

| | |
|---|---|
| *F16J 15/02* | (2006.01) |
| *F16J 15/10* | (2006.01) |
| *F02K 1/80* | (2006.01) |
| *F16J 15/08* | (2006.01) |

(52) U.S. Cl.
CPC ............ *F16J 15/104* (2013.01); *F02K 1/805* (2013.01); *F16J 15/0887* (2013.01); *Y02T 50/672* (2013.01)

(58) Field of Classification Search
CPC ....... F02K 1/805; F16J 15/0887; F16J 15/104
USPC ................ 415/214.1; 277/616, 630, 637, 277/640–642, 643, 644; 244/130, 131, 244/129.1, 53 R
See application file for complete search history.

(56) References Cited

U.S. PATENT DOCUMENTS

| | | | |
|---|---|---|---|
| 4,043,714 A | 8/1977 | Berkowitz | |
| 5,101,624 A | 4/1992 | Nash et al. | |
| 5,249,419 A * | 10/1993 | Landhuis | ........................ 60/766 |
| 6,109,663 A | 8/2000 | Hayton | |
| 6,883,807 B2 * | 4/2005 | Smed | ............................ 277/644 |
| 7,090,459 B2 | 8/2006 | Bhate et al. | |
| 7,367,567 B2 | 5/2008 | Farah et al. | |
| 7,611,099 B2 * | 11/2009 | Kordel et al. | ................. 244/215 |
| 7,757,477 B2 | 7/2010 | Kehret et al. | |
| 7,975,488 B2 | 7/2011 | Farah et al. | |
| 2007/0149031 A1 | 6/2007 | Martin et al. | |
| 2011/0185740 A1 * | 8/2011 | Dierberger et al. | ............. 60/755 |
| 2012/0119447 A1 * | 5/2012 | Demiroglu et al. | ........... 277/637 |

FOREIGN PATENT DOCUMENTS

| | | |
|---|---|---|
| EP | 1705343 A2 | 9/2006 |
| EP | 1792828 A2 | 6/2007 |

OTHER PUBLICATIONS

European Patent Office, Extended European Search Report, Feb. 13, 2013, 7 pages.

* cited by examiner

*Primary Examiner* — Vishal Patel
*Assistant Examiner* — Thomas Neubauer
(74) *Attorney, Agent, or Firm* — Kinney & Lange, P.A.

(57) ABSTRACT

A seal for bridging an interface between an aircraft exhaust deck and a trailing edge of an aircraft exhaust system includes a sheet, a spacing element, and a tensioning element. The sheet has a fixed end, a cover portion, a movable portion, and a free end. The fixed end is anchored to the trailing edge. The cover portion extends upstream from the fixed end and across the interface. The movable portion is located adjacent the aircraft exhaust deck. The spacing element engages the movable portion and defines a gap for cooling air between the movable portion and the aircraft exhaust deck. The tensioning element is attached to the free end and provides tensioning force keep the cover portion taut.

15 Claims, 5 Drawing Sheets

VARIABLE WIDTH GAP SEAL

BACKGROUND

This disclosure relates generally to seals, and more specifically to seals for accommodating an interface having a variable width.

Aircraft typically include exhaust systems for directing exhaust gases from one or more engines to the ambient air. The aviation industry historically used exhaust systems that were round in shape. These round exhaust systems were highly reflective and therefore, easily detected by radar. Some modern aircraft now use "non-round" exhaust systems with "reduced signature features" to better avoid detection by radar.

Regardless of the shape of a given exhaust system, seals are commonly employed between components for various purposes. Known seals for exhaust systems include M-seals, rope seals, and finger seals. Seal type and specific structure is chosen based on its desired properties and application. Often seals are designed to prevent or accurately control air leakage between components. The extent to which a given seal accomplishes its purpose, otherwise known as "sealing efficiency", can affect overall aircraft performance.

SUMMARY

A seal for bridging an interface between an aircraft exhaust deck and a trailing edge of an aircraft exhaust system includes a sheet, a spacing element, and a tensioning element. The sheet has a fixed end, a cover portion, a movable portion, and a free end. The fixed end is anchored to the trailing edge. The cover portion extends upstream from the fixed end and across the interface. The movable portion is located adjacent the aircraft exhaust deck. The spacing element engages the movable portion and defines a gap for cooling air between the movable portion and the aircraft exhaust deck. The tensioning element is attached to the free end and provides tensioning force keep the cover portion taut.

A seal for bridging an interface between a first material and a second material includes a first fitting, a second fitting, a sheet, a spacing element, and a tensioning element. The first fitting has a top and a downstream side. The downstream side interacts with the first material on a first side of the interface. The second fitting has a top and an upstream side. The upstream side interacts with the second material on a second side of the interface. The sheet has a fixed end, a cover portion, a movable portion, and a free end. The fixed end is anchored between the downstream side of the first fitting and the first material. The cover portion extends upstream from the fixed end and across the tops of both the first fitting and the second fitting to bridge the interface. The movable portion extends along the upstream side of second fitting. The spacing element engages the movable portion and defines a gap for cooling air between the movable portion and the second material. The tensioning element is attached to the free end and provides tensioning force to keep the cover portion taut.

A seal for bridging an interface between a first material and a second material includes a first fitting, a second fitting, an expansion element, a sheet, a spacing element, and a tensioning element. The first fitting has a top and a downstream side that interacts with the first material on a first side of the interface. The second fitting has a support and a tube. The tube has a rotating engagement with a concave side of the support and an interaction with the second material on a second side of the interface. The expansion element is located between the first fitting and the second fitting. The expansion element exerts an expansion force against both the first fitting and second fitting to accommodate changes in interface size. The sheet has a fixed end, a cover portion, a movable portion, and a free end. The fixed end is anchored between the downstream side of the first fitting and the first material. The cover portion extends upstream from the fixed end across the tops of both the first fitting and the second fitting to bridge the interface. The movable portion extends along the upstream side of second fitting. The spacing element engages the movable portion of the sheet and defines a gap for cooling air between the movable portion and the second material. The tensioning element is attached to the free end and provides tensioning force to keep the cover portion taut.

DETAILED DESCRIPTION

Figure 1A:
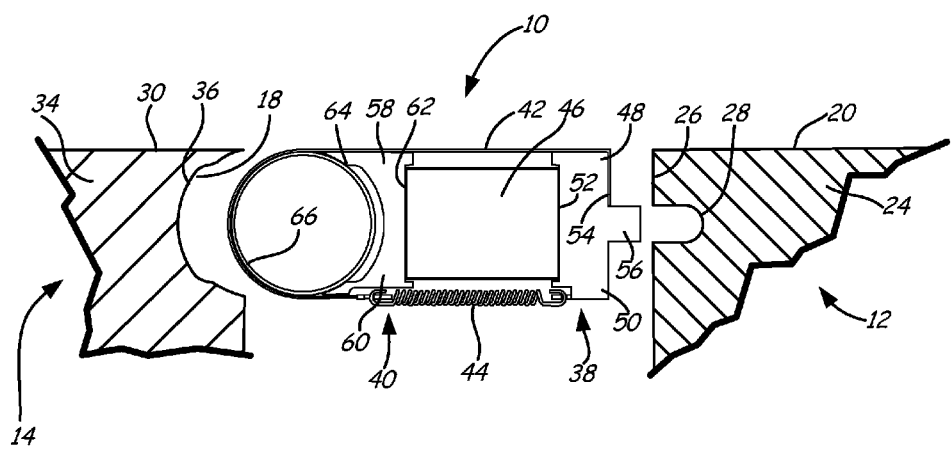
FIG. 1A is an exploded cross-sectional view of a variable width seal between two materials in accordance with the present disclosure.
Figure 1B:
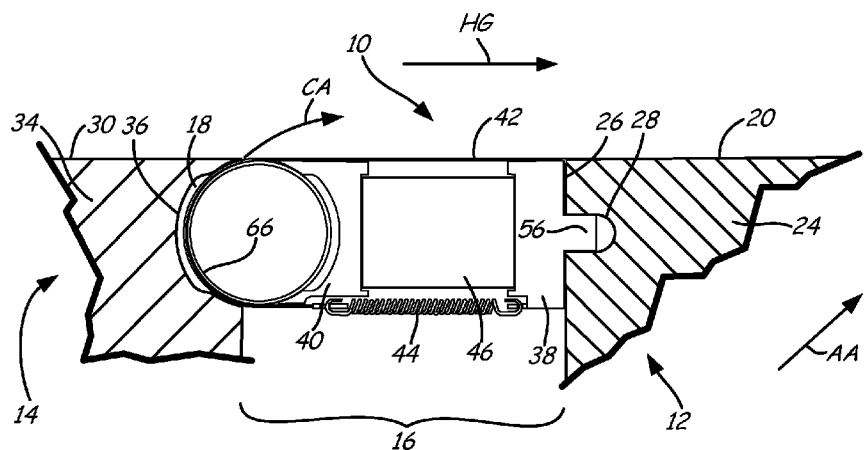
FIG. 1B is an assembled cross-sectional view of the variable width seal of FIG. 1.

FIG. 1A is an exploded cross-sectional view and FIG. 1B is an assembled cross-sectional view of variable width seal 10 between trailing edge 12 and aircraft exhaust deck 14 of an aircraft exhaust system. Seal 10 spans interface 16 between trailing edge 12 and aircraft exhaust deck 14, and also accommodates gap 18 for cooling air. Trailing edge 12 includes top 20, downstream side 24, upstream side 26, and notch 28. Aircraft exhaust deck includes top 30, upstream side 34, and downstream side 36. Seal 10 includes trailing edge (TE) fitting 38, aircraft exhaust deck (AD) fitting 40, sheet 42, tensioning elements 44, and expansion element 46. TE fitting 38 includes top 48, bottom 50, upstream side 52, and downstream side 54, and tang 56. AD fitting 40 includes top 58, bottom 60, downstream side 62, upstream side 64, and reel tube 66. Seal 10 is configured to expand and contract in order to accommodate changes in width of interface 16.

Trailing edge 12 has top 20, downstream side 24, and upstream side 26. Top 20 is an uppermost portion of trailing edge 12 and is in contact with a flow of hot gases HG. As indicated by name, downstream side 24 of trailing edge 12 is downstream of upstream side 26. Notch 28 is formed centrally in upstream side 26 of trailing edge 12. Aircraft exhaust deck 14 has top 30, upstream side 34, and downstream side 36. Top 30 is an uppermost portion of aircraft exhaust deck 14 and is in contact with a flow of hot gases HG. As indicated by name, upstream side 34 of aircraft exhaust deck is upstream of downstream side 36. The space between upstream side 26 of trailing edge 12 and downstream side 36 of aircraft exhaust deck 14 forms interface 16.

Trailing edge 12 and aircraft exhaust deck 14 are joined at interface 16 to form a portion of an aircraft exhaust system. Aircraft exhaust deck 14 is located upstream of trailing edge 12. Hot gases HG from an aircraft engine flow across top 30 of aircraft exhaust deck 14 and subsequently, across top 20 of trailing edge 12. Trailing edge 12 is the most terminal portion of the exhaust system and therefore, downstream side 24 can be adjacent a flow of ambient air AA. Accordingly, a large temperature gradient (about 1000 degrees Fahrenheit) may exist across trailing edge 12. A flow of cooling air CA (e.g. pressurized bleed air from compressor of engine) passes through gap 18 located between trailing edge 12 and aircraft exhaust deck 14 to protect the material forming trailing edge 12 from thermal stresses. In one embodiment, trailing edge 12 is formed from a ceramic matrix composite while aircraft exhaust deck 14 is formed from a metal. Since the metal of aircraft exhaust deck 14 will exhibit five to six times more thermal growth than the ceramic composite of trailing edge 12, interface 16 width will vary. Seal 10 is designed to accommodate this variance of interface 16 while maintaining a consistent size gap 18 for cooling air CA.

Seal 10 includes TE fitting 38 at a downstream side and AD fitting 40 at an upstream side. Sheet 42 extends across tops of both TE fitting 38 and AD fitting 40 to bridge interface 16. In the depicted embodiment, sheet 42 is formed from metal. A plurality of tensions elements 44 extend between sheet 42 and TE fitting 38. Each tensioning element 44 has a first or upstream side attached to sheet 42 and a second or downstream side attached to TE fitting 38. In embodiment depicted, tensioning elements 44 are metal helical tension springs for exerting a tensioning force on sheet 42. Expansion element 46 is centrally located between TE fitting 38 and AD fitting 40. In the embodiment depicted, expansion element 46 is a single corrugated metal spring that exerts an expansion force against both TE fitting 38 and AD fitting 40. In other words, expansion element 46 includes an outward bias for engaging TE fitting 38 and AD fitting 40. When seal 10 is inserted into interface 16, expansion element 46 is in a partially compressed form so that it can expand or contract to vary an overall width of seal 10 in response to a changed in interface 16 size.

TE fitting 38 is defined by top 48, bottom 50, upstream side 52, and downstream side 54. As indicated by name, top 48 is above bottom 50 and upstream side 52 is located upstream of downstream side 54. Downstream side 54 of TE fitting includes tang 56 extending in a downstream direction toward trailing edge 12. Tang 56 is received into notch 28 located in upstream side 26 of trailing edge 12. A downstream or fixed end of sheet 42 is located between upstream side 26 of trailing edge 12 and downstream side 54 of TE fitting 38. A central or cover portion of sheet 42 extends in an upstream direction along top 48 of TE fitting 38.

AD fitting 40 is defined by top 58, bottom 60, downstream side 62, and upstream side 64. As indicated by name, top 58 is above bottom 60 and downstream side 62 is located downstream of upstream side 64. Reel tube 66 is located between upstream side 64 of AD fitting 40 and downstream side 36 of aircraft exhaust deck 14. Reel tube 66 has a rotating engagement with upstream side of AD fitting 40. Top 58 and bottom 60 have fingers that extend in an upstream direction to engage reel tube 66. The central portion of sheet 42 extends upstream along top 58 of AD fitting 40 and a movable portion of sheet 42 extends along reel tube 66. The movable portion of sheet 42 terminates in a free end that is secured to tensioning elements 44.

As shown in FIGS. 1A and 1B, seal 10 is positioned within interface 16 such that TE fitting 38 is facing trailing edge 12, and AD fitting 40/reel 66 are facing aircraft exhaust deck 14. Tang 56 of TE fitting 38 inserts into notch 28 of trailing edge 12 to control a vertical location of seal 10. Notch 28 can include a generous radius to avoid stress concentration within trailing edge 12. On either side of tang 56, downstream side 54 of TE fitting 38 is adjacent upstream side 26 of trailing edge 12. Top 48 of TE fitting 38 is aligned with top 20 of trailing edge 12, such that sheet 42 extending across top 48 of TE fitting 38 is flush with top 20 of trailing edge 12. Top 58 of AD fitting 40 and reel tube 66 are aligned with top 30 of aircraft exhaust deck 14, such that sheet 42 extending across top 58 of AD fitting and reel tube 66 is flush with top 30 of aircraft exhaust deck 14. Downstream side 36 of aircraft exhaust deck 14 cooperates with reel tube 66 and sheet 42 extending around reel tube 66 via spacing elements (shown and described with reference to FIG. 4) to define gap 18 for cooling air CA.

If interface 16 widens, expansion element 46 expands outwardly thereby urging TE fitting 38 toward trailing edge 12 and AD fitting 40/reel 66 toward aircraft exhaust deck 14. The increased distance between TE fitting 38 and AD fitting 40 will cause the movable portion of sheet 42 to slide along reel tube 60, similar to the action of a window shade unrolling. If interface 16 shrinks, expansion element 46 is compressed by the movement of TE fitting 38 and AD fitting 40 toward one another. Tensioning elements 44 exert tension on the free end of sheet 42 to keep the cover portion taut against top 48 of TE fitting 38 and top 58 of AD fitting, similar to the action of a window shade rolling in. In other words, sheet 42 is rigid in plane, but flexible to bend. Regardless of the width of interface 16, and therefore seal 10, gap 18 for cooling air between seal 10 and aircraft exhaust deck 14 remains constant. Spacing elements (shown and described with reference to FIG. 4) allow seal 10 to tightly control gap 18 for cooling air while expanding and contracting to bridge varying widths of interface 16. The structure and function of seal 10 is described further below with reference to FIGS. 2-4.

Figure 2:
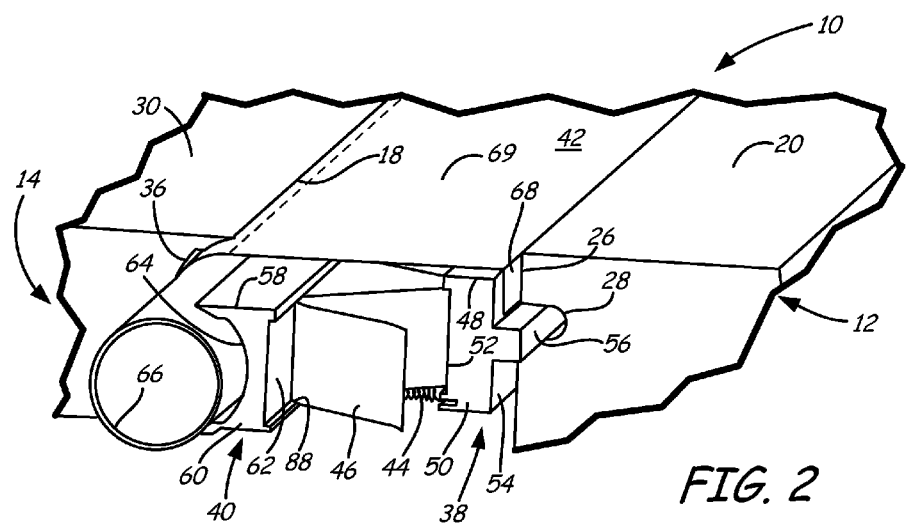
FIG. 2 is a cut-away top perspective view of the variable width seal of FIGS. 1A and 1B.
Figure 3:
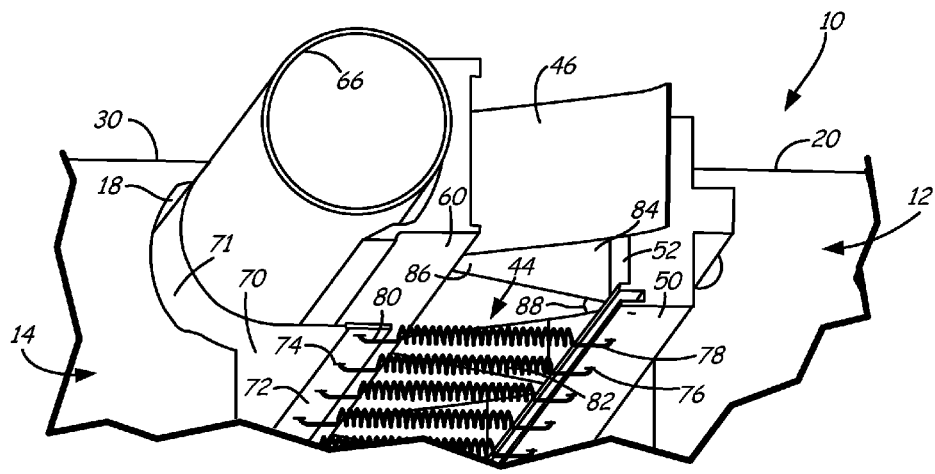
FIG. 3 is a cut-away bottom perspective with of the variable width seal of FIGS. 1A-2.

FIG. 2 is a cut-away top perspective view, and FIG. 3 is a cut-away bottom perspective view, of variable width seal 10 of FIGS. 1A and 1B. Seal 10 is located within interface 16 between trailing edge 12 and aircraft exhaust deck 14 and accommodates gap 18. Seal 10 includes TE fitting 38, AD fitting 40, sheet 42, tensioning elements 44, and expansion element 46. TE fitting 38 includes top 48, bottom 50, upstream side 52, and downstream side 54, and tang 56. AD fitting 40 includes top 58, bottom 60, downstream side 62, upstream side 64, and reel tube 66. Sheet 42 includes downstream or fixed end 68, central or cover portion 69, free or upstream end 70, movable portion 71, bead 72, and holes 74. Bottom 50 of TE fitting 38 also has holes 76. Each tension element 44 includes first or downstream end 78, second or upstream end 80, and coiled center 82. Expansion element 46 includes first side 84, second side 86, and folds 88. Tensioning elements 44 exert a tensioning force on sheet 42 while expansion element 46 exerts an expansion force on TE fitting 38 and AD fitting 40, such that seal 10 can accommodate variable width interface 16.

As described with reference to FIGS. 1A and 1B, TE fitting 38 cooperates with trailing edge 12, and AD fitting 40/reel tube 66 cooperate with aircraft exhaust deck 14. Sheet 42 extends across both TE fitting 38 and AD fitting 40, and subsequently around reel tube 66. More specifically, downstream or fixed end 68 of sheet 42 is anchored between downstream side 54 of TE fitting 38 and upstream side 26 of trailing edge 12. From downstream end 68, cover portion 69 of sheet 42 extends in the upstream direction across top 48 of TE fitting 38, over expansion element 46, and across top 58 of AD fitting 40. Movable portion 71 extends from cover portion 69 and wraps around reel tube 66 toward bottom 60 of AD fitting 40. Downstream or free end 70 of sheet 42 is located adjacent bottom 60 of AD fitting and includes bead 72, which can be a folded (e.g. doubled back) and/or reinforced section of sheet 42. Upstream side 64 of AD fitting 40 is concave to receive reel tube 66 and allow reel tube 66 to rotate. An upstream side of both top 58 and bottom 60 and AD fitting 40 include projections to contain reel tube 66. Movable portion 71 of sheet 42 is movable such that it slides or scrolls along reel tube 66 to accommodate changes in an overall width of seal 10.

A series of holes 74 extend through bead 72 for receiving tensioning elements 44. Similarly, a series of holes 76 are formed in bottom 50 of TE fitting 38 for receiving tensioning elements 44. Each hole 76 is directly downstream of one of holes 74. In the depicted embodiment, tensioning elements 44 are metal coiled springs. Each tensioning element 44 has first end 78, second end 80, and coiled center 82 extending between first end 78 and second end 80. First end 78 has a hook that extends through hole 76 to couple tensioning element 44 to TE fitting 38. Similarly, second end 80 has a hook that extends through hole 74 to couple tensioning element 44 to upstream end 70 of sheet 42. Accordingly, a series of tensioning elements 44 are attached between TE fitting 38 and sheet 42 to keep sheet 42 taut regardless of an overall width of seal 10.

In the depicted embodiment, expansion element 46 is a metal corrugated spring having an outward bias for engaging TE fitting 38 and AD fitting 40. Expansion element 46 has first side 84 in contact with upstream side 52 of TE fitting 38, which forms a track for receiving first side 84 of expansion element 46. Similarly, second side 86 of expansion element 46 is in contact with downstream side 62 of AD fitting 40, which forms a track for receiving second side 86 of expansion element 46. Vertical folds 88 are alternately located on first side 84 and second side 86 of expansion element 46. Expansion element 46 exerts an expansion force against both TE fitting 38 and AD fitting 40 to increase an overall width of seal 10 in response to growth in width of interface 16. The force of expansion element 46 is greater than the force of tensioning element 44 and therefore, seal 10 remains contained within interface 16.

Figure 4:
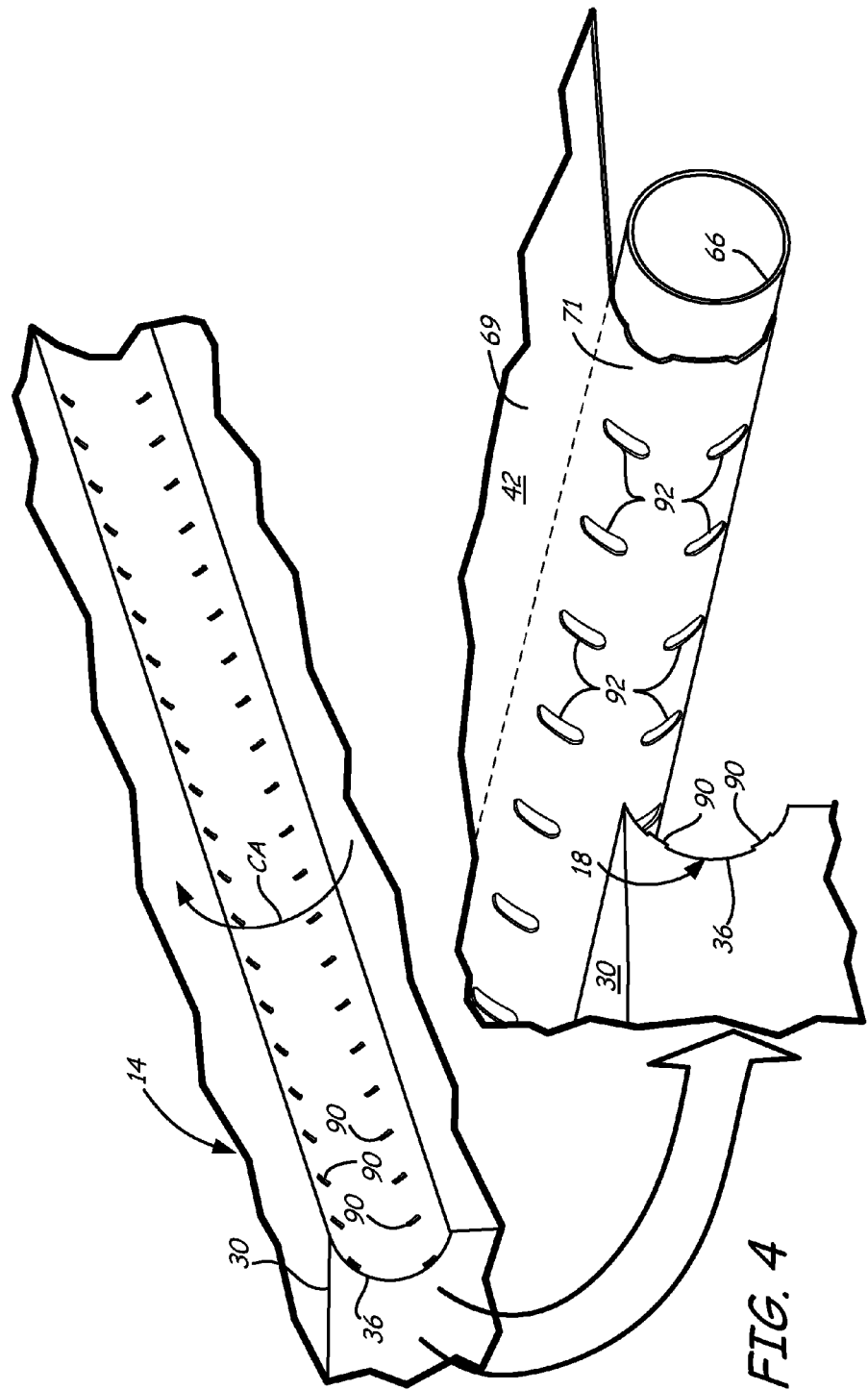
FIG. 4 is an exploded and rotated view of an aircraft exhaust deck, a sheet, and a reel tube from the variable width seal of FIGS. 1A-3.

FIG. 4 is an exploded and rotated view of aircraft exhaust deck 14, sheet 42, and reel tube 66 from variable width seal 10 of FIGS. 1A-3. Aircraft exhaust deck 14 includes top 30, downstream side 36, and spacing elements 90. Sheet 42 includes cover portion 69, movable portion 71 and slots 92. Spacing elements 90 of aircraft exhaust deck 14 cooperate with slots 92 in sheet 42 to define gap 18 for cooling air CA.

As described above with reference to FIGS. 1A-3, gap 18 for cooling air CA is located between seal 10 and aircraft exhaust deck 14. More specifically, cooling air CA flows upwardly along downstream side 36 of aircraft exhaust deck and upstream end 70 of sheet 42. Spacing elements 90 define and maintain a constant space for gap 18. In the depicted embodiment, spacing elements 90 are stand off feet that protrude in a downstream direction from the concave surface of downstream side 36 of aircraft exhaust deck 14. In the depicted embodiment, two rows of spacing elements 90 are positioned in parallel along downstream side 36 of aircraft exhaust deck 14. A first row of spacing elements 90 is positioned near top 30 and a second row is positioned beneath the first row. To cooperate with spacing elements 90, movable portion 70 of sheet 42 includes a plurality of slots 92. Like spacing elements 90, two parallel rows of slots 92 extend through movable portion 70 of sheet. Both spacing elements 90 and slots 92 are ellipse shaped. Slots 92, however, are larger than spacing elements 90 and therefore allow for movement of sheet 42 around spacing elements 90.

When seal 10 is inserted into interface 16, each slot 92 in movable portion 70 of sheet 42 receives a spacing element 90 extending from downstream side 36 of aircraft exhaust deck 14. The cooperation between slots 92 and spacing elements 90 keeps seal 10 securely positioned within interface 16, while tightly controlling the space for gap 18. In the depicted embodiment, gap 18 has a width of about 0.005 inches and sheet 42 has a thickness of about 0.005 inches. As seal 10 expands and contracts to accommodate changes in width of interface 16, movable portion 71 of sheet 42 moves or scrolls along reel 66. Each spacing element 90 is configured to slide from one side of a given slot 92 to a second, opposite side of the given slot 92 to accommodate this movement of sheet 42. Cooling air CA flows between and around the mating of spacing elements 90 and slots 92 through tightly controlled gap 18 to manage the thermal gradient across trailing edge 12.

Figure 5:
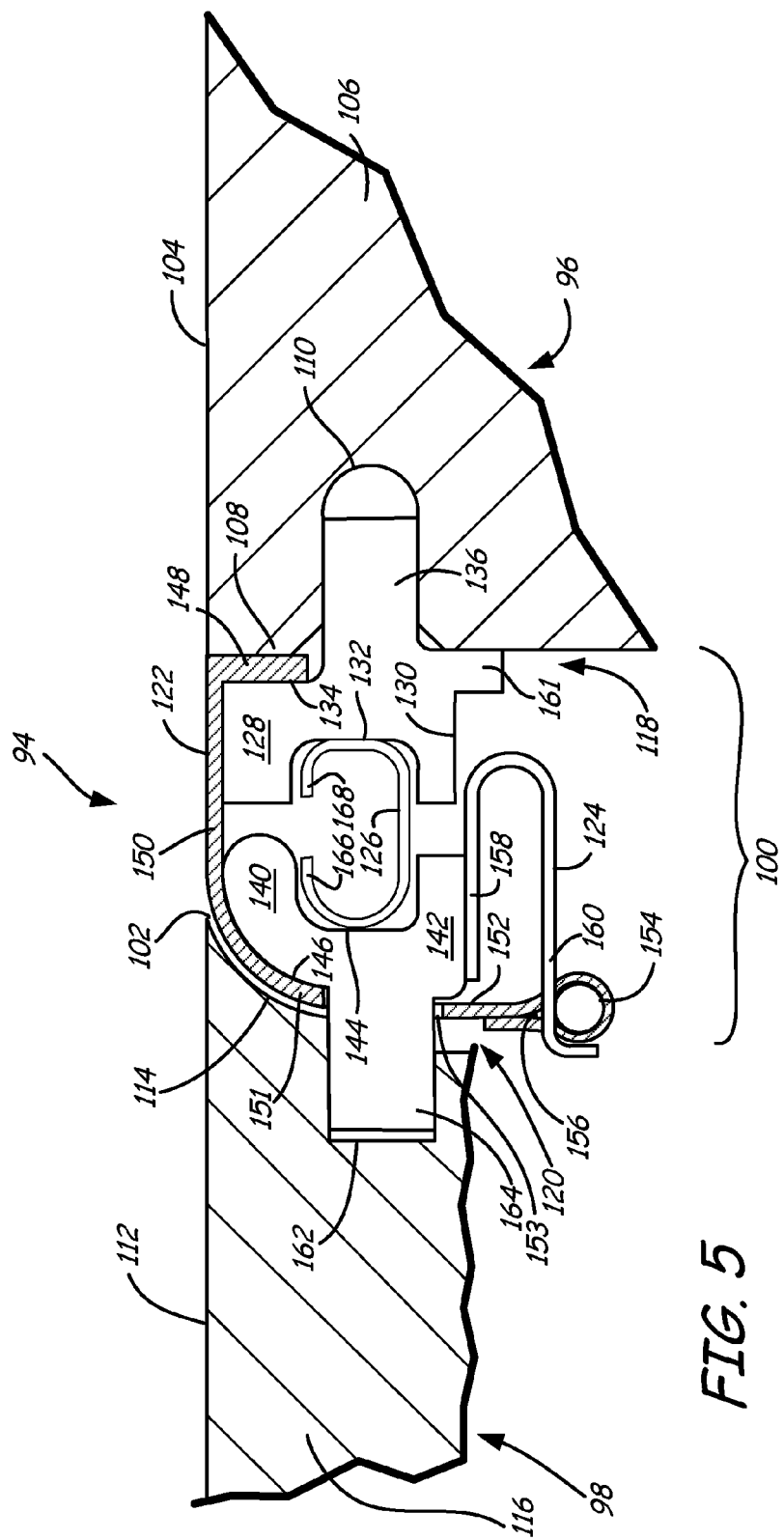
FIG. 5 is a cross-sectional view of another embodiment of a variable width seal in accordance with the present disclosure.

FIG. 5 is a cross-sectional view of another embodiment of variable width seal 94 inserted between trailing edge 96 and aircraft exhaust deck 98 of an aircraft exhaust system. Seal 94 spans interface 100 between trailing edge 96 and aircraft exhaust deck 98, and also accommodates gap 102 for cooling air. Trailing edge 96 includes top 104, downstream side 106, upstream side 108, and notch 110. Aircraft exhaust deck 98 includes top 112, downstream side 114, and upstream side 116. Seal 94 includes trailing edge (TE) fitting 118, aircraft exhaust deck (AD) fitting 120, sheet 122, tensioning elements 124, and expansion element 126. TE fitting 118 includes top 128, bottom 130, upstream side 132, and downstream side 134, and tang 136. AD fitting 120 includes top 140, bottom 142, downstream side 144, and upstream side 146. Sheet 122 includes upstream end 148, cover portion 150, movable portion 151, downstream end 152, slots 153, bead 154, and holes 156. Each tensioning element 124 includes first end 158 and second end 160. TE fitting 118 has protrusion 161, aircraft exhaust deck 98 has notch 162, and AD fitting 120 has tangs 164. Expansion element 126 has first end 166 and second end 168. Seal 94 is configured to expand and contract in order to accommodate changes in width of interface 100.

Like seal 10 described above with reference to FIGS. 1A-4, seal 94 bridges interface 100 between trailing edge 96 and aircraft exhaust deck 98, but seal 94 does not include any rotating parts (i.e. reel tube 66). Seal 94 includes TE fitting 118 at a downstream side and AD fitting 120 at an upstream side. Sheet 122 extends across both TE fitting 118 and AD fitting 120 to bridge interface 100. A plurality of tensioning elements 124 extend between AD fitting 120 and sheet 122 and exert a tensioning force on sheet 122. Expansion element 126 is centrally located between TE fitting 118 and AD fitting 120 and exerts an expansion force on both TE fitting 118 and AD fitting 120.

TE fitting 118 is defined by top 128, bottom 130, upstream side 132, and downstream side 134. As indicated by name, top 128 is above bottom 130 and upstream side 132 is located upstream of downstream side 134. Downstream side 134 of TE fitting 118 includes tang 136 extending in a downstream direction toward trailing edge 96. Tang 136 is received into notch 110 located in upstream side 108 of trailing edge 96. AD fitting 120 is defined by top 140, bottom 142, downstream side 144, and upstream side 146. As indicated by name, top 140 is above bottom 142 and downstream side 144 is located downstream of upstream side 146. Top 128 of TE fitting 118 is aligned with top 140 of trailing edge 96, and top 140 of AD fitting 120 is aligned with top 112 of aircraft exhaust deck 98.

Sheet 122 extends across TE fitting 118 and AD fitting 120 to bridge interface 100. Downstream or fixed end 148 of sheet 122 is secured between upstream side 108 of trailing edge 96 and downstream side 134 of AD fitting 118. From downstream end 148, center portion 150 of sheet 122 extends in an upstream direction across top 128 of TE fitting 118 and top 144 of AD fitting 120. Movable portion 151 of sheet 122 extends along upstream side 146 of AD fitting 120 and terminates in upstream or free end 152, which is secured to tensioning elements 124. A series of slots 153 extend through movable portion 151 of sheet 122 to accommodate tangs 164. Gap 102 for cooling air is located between movable portion 151 of sheet 122 and downstream side 114 of aircraft exhaust deck 114. In the depicted embodiment, gap 102 has a width of about 0.005 inches and sheet 122 has a thickness of about 0.005 inches. Upstream end 152 includes bead 154 having holes 156 for receiving tension elements 124. In the depicted embodiment, tensioning elements 124 are U-shaped sheet metal finger spring with a retention tang. Each tensioning element 124 has first end 158 anchored to bottom 142 AD fitting 120 by a fastener (i.e. rivet, screw, etc.) and second end 160 attached to upstream end 152 of sheet 122. Second end 160 of tensioning elements 124 extend through holes 156 at the location of bead 154, which provides reinforcement to sheet 122. Tensioning elements 124 exert a tensioning force on sheet 122 to keep it taut against top 128 of TE fitting 118 and top 140 of AD fitting 120.

TE fitting 118 also includes protrusion 161 extending downwardly from bottom 130 at downstream side 134. Protrusion 161 is in contact with upstream side 108 of trailing edge 96 and assists in securing TE fitting 118 to trailing edge 96. Aircraft exhaust deck 98 includes notch 162 extending in an upstream direction into upstream side 114. Notch 162 is configured to receive spacing elements or tangs 164, which extend in an upstream direction from upstream side 146 of AD fitting 120. Each tang 164 extends through a given slot 153 in movable portion 151 of sheet 122 (similar to slots 92 shown in FIG. 4). Notch 162 and tang 164 mate to define gap 102 for cooling air. Regardless of the width of interface 100, and therefore seal 94, gap 102 for cooling air between seal 94 and aircraft exhaust deck 98 remains constant. Upstream side 146 of AD fitting 120 is contoured and smooth to allow movable portion 151 of sheet 122 to freely move up and down in response to downward force from tensioning element 124. In the depicted embodiment, upstream side 146 is formed from a low friction material (i.e. graphite).

Upstream side 122 of TE fitting 118 and downstream side 144 of AD fitting 120 are concave to jointly form a central cavity for containing expansion element 126. In the depicted embodiment, expansion element 126 is a rolled sheet metal finger spring expansion element. Expansion element 126 has first end 166 located near top 140 of AD fitting 120 and second end 168 located near top 128 of TE fitting 118. If interface 100 grows, expansion element 126 will unroll such that first end 166 pushes AD fitting 120 outwardly and second end 168 pushes TE fitting 118 outwardly. In contrast, if interface 100 shrinks, inward force by TE fitting 118 and AD fitting 120 will cause expansion element 126 to curl inwardly on itself. Accordingly, seal 94 can assume variable widths to bridge changes in interface 100 size. Expansion element 126 allows seal 94 to shrink and grow in width, tensioning elements 124 maintain sheet 122 taut across TE fitting 118 and AD fitting 120 during changes in seal 94 width, and tang 164 and notch 162 cooperate to tightly control gap 102 for cooling air.

Figure 6:
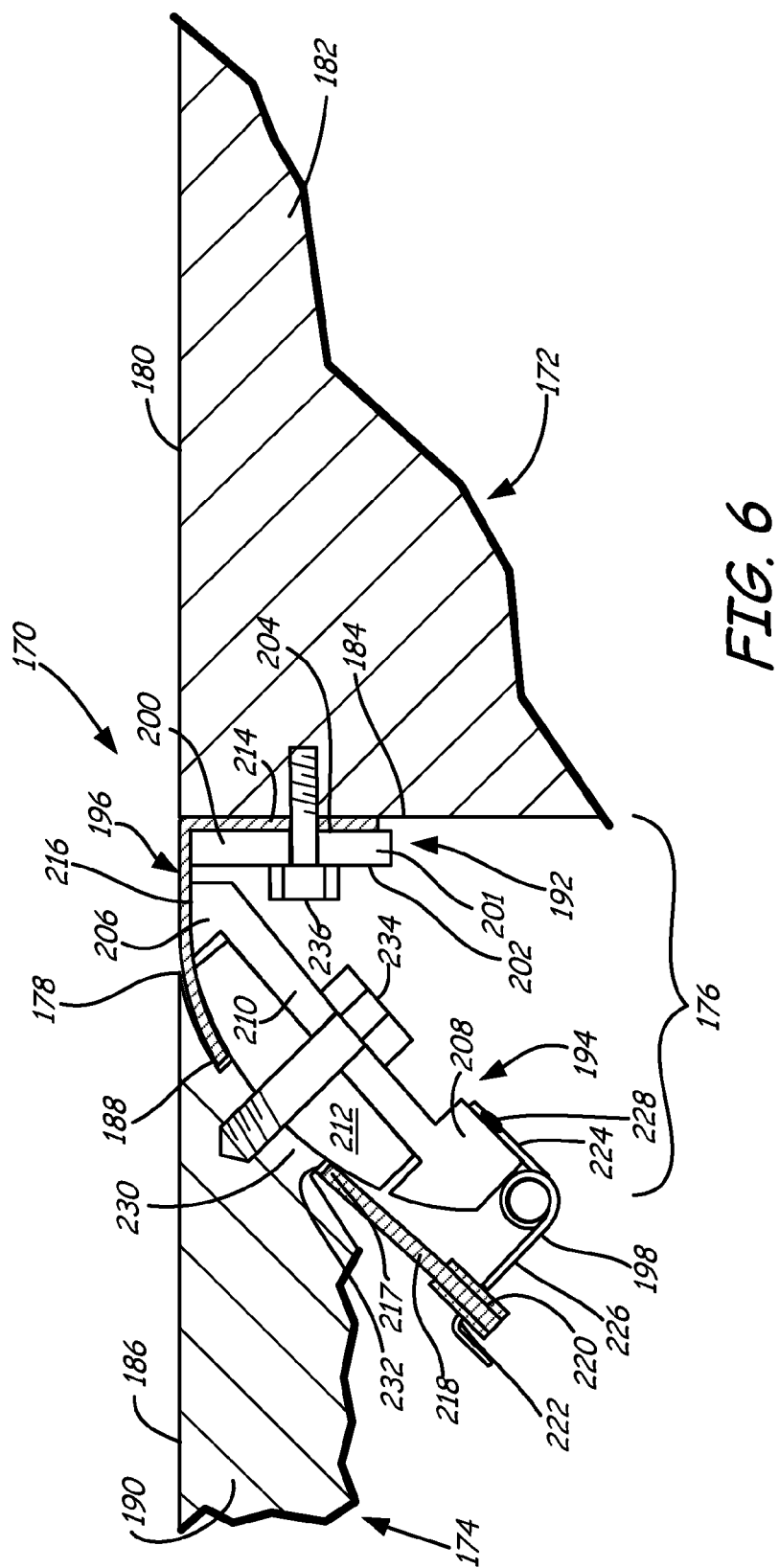
FIG. 6 is a cross-sectional view of another embodiment of a variable width seal in accordance with the present disclosure.

FIG. 6 is a cross-sectional view of another embodiment of variable width seal 170 inserted between trailing edge 172 and aircraft exhaust deck 174 of an aircraft exhaust system. Seal 170 spans interface 176 between trailing edge 172 and aircraft exhaust deck 174, and also accommodates gap 178 for cooling air. Trailing edge 172 includes top 180, downstream side 182, and upstream side 184. Aircraft exhaust deck 174 includes top 186, downstream side 188, and upstream side 190. Seal 170 includes trailing edge (TE) fitting 192, aircraft exhaust deck (AD) fitting 194, sheet 196, and tensioning elements 198. TE fitting 192 includes top 200, bottom 201, upstream side 202, and downstream side 204. AD fitting 194 includes top 206, bottom 208, downstream side 210, and upstream side 212. Sheet 196 includes upstream or fixed end 214, central or cover portion 216, movable portion 217, downstream or free end 218, bead 220, and holes 222. Tensioning elements 198 include first end 224 and second end 228. Fastener 228 attaches first end 224 to AD fitting 194. Aircraft exhaust deck 174 has spacing element 230 that extends through slot 232 in sheet 196. First bolt 234 secures AD fitting 194 to aircraft exhaust deck 174 and second bolt 236 secures TE fitting 192 to trailing edge 172. Seal 170 is configured to expand and contract in order to accommodate changes in width of interface 176.

Like seal 10 described above with reference to FIGS. 1A-4, and seal 94 described above with reference to FIG. 5, seal 170 bridges interface 176 between trailing edge 172 and aircraft exhaust deck 174. In contrast to seal 10 and seal 94, seal 170 is fixed to both trailing edge 173 and aircraft exhaust deck 174 and therefore, does not include any expansion element (i.e. reference number 46 in FIGS. 1A-4 and reference number 126 in FIG. 5). Seal 170 includes TE fitting 192 at a downstream side and AD fitting 194 at an upstream side. Sheet 196 extends across both TE fitting 192 and AD fitting 194 to bridge interface 176. A plurality of tensioning elements 198 extend between AD fitting 194 and sheet 196 and exert a tensioning force on sheet 196.

TE fitting 192 is defined by top 200, bottom 201, upstream side 202, and downstream side 204. As indicated by name, top 200 is located above bottom 201, and upstream side 202 is located upstream of downstream side 204. TE fitting 192 is substantially rectangular such that top 200 is parallel to bottom 201 and upstream side 202 is parallel to downstream side 204. AD fitting 194 is defined by top 206, bottom 208, downstream side 210, and upstream side 212. As indicated by name, top 206 is located above bottom 208, and downstream side 210 is located downstream of upstream side 212. Top 200 of TE fitting 192 is aligned with top 180 of trailing edge 172, and top 206 of AD fitting 194 is aligned with top 186 of aircraft exhaust deck 174.

Sheet 196 extends across TE fitting 192 and AD fitting 194 to bridge interface 176. Downstream or fixed end 214 of sheet 196 is secured between upstream side 184 of trailing edge 172 and downstream side 204 of TE fitting 192. From downstream end 214, center or cover portion 216 of sheet 196 extends in an upstream direction across top 200 of TE fitting 192 and subsequently, across top 206 of AD fitting 194. From cover portion 216, movable portion 217 of sheet 196 extends along upstream side 212 of AD fitting 194 and terminates in upstream or free end 218 is secured to tensioning elements 198. Gap 178 for cooling air is located between movable portion 217 of sheet 196 and downstream side 188 of aircraft exhaust deck 174. In the depicted embodiment, gap 178 has a width of about 0.005 inches and sheet 196 has a thickness of about 0.005 inches. Upstream end 218 includes bead 220 and holes 222 for receiving tension elements 198. In the depicted embodiment, tensioning elements 198 are wire wound torsion springs. Each tensioning element 198 has first end 224 anchored to bottom 208 AD fitting 194 by fastener 228 and second end 226 attached to upstream end 218 sheet 196. Second ends 226 of tensioning elements 198 extend through holes 222 in bead 220 of sheet 196. Tensioning elements 198 exert a tensioning force on sheet 196 to keep it taut against top 200 of TE fitting 192 and top 206 of AD fitting 194.

Spacing elements 230 extend in a downstream direction from downstream side 188 of aircraft exhaust deck 174 and contact upstream side 212 of AD fitting 194. In the depicted embodiment, spacing elements 230 are stand off feet (similar to spacing elements 90 shown in FIG. 4). Upstream end 218 of sheet 196 includes slots 232 (similar to slots 92 shown in FIG. 4) for receiving spacing elements 230. Spacing elements 230 define gap 178 for cooling air, which remains relatively constant regardless of an overall width of seal 170. Upstream side 212 of AD fitting 194 is contoured and smooth to allow movable portion 217 of sheet 196 to freely move up and down in response to downward force from tensioning elements 198. In the depicted embodiment, upstream side 212 is formed from a low friction material (i.e. graphite).

Seal 170 is fixed to aircraft exhaust deck 174 by first bolt 100 and to trailing edge 172 by second bolt 102. First bolt 100 extends upstream from a central location of seal 170 through AD fitting 194 and into aircraft exhaust deck 174. More specifically, first bolt 100 extends from downstream side 210 through insert and upstream side 212 of AD fitting 194 and into stand off foot 230 on downstream side 188 of aircraft exhaust deck 174. Second bolt extends downstream from a central location of seal 170 through TE fitting 192 and sheet 196, and into trailing edge 172. More specifically, second bolt 102 extends from upstream side 202 through TE fitting 192 to downstream side 204, through downstream end 214 of sheet 196 and into upstream side 184 of trailing edge 172. Since AD fitting 194 is bolted to aircraft exhaust deck 174 and TE fitting 192 is bolted to trailing edge 172, seal 170 does not require an expansion element to expand or contract. Seal 170 can assume variable widths to bridge changes in interface 176 size while accurately maintaining gap 178 for cooling air.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal for bridging an interface between an aircraft exhaust deck and a trailing edge of an aircraft exhaust system, the seal comprising:
   a first fitting having a top and a downstream side, the downstream side adjacent to the trailing edge on a first side of the interface;
   a second fitting having a top and an upstream side, the upstream side in contact with the aircraft exhaust deck on a second side of the interface;
   a spring located between the first fitting and the second fitting, the spring exerting an expansion force against both the first fitting and the second fitting so as to keep the first fitting in contact with the trailing edge and the second fitting in contact with the aircraft exhaust deck to accommodate changes in interface size between the aircraft exhaust deck and the trailing edge, the expansion force being balanced by a force exerted on the first fitting by the trailing edge and a force being exerted on the second fitting by the exhaust deck;
   a sheet having a fixed end, a cover portion, a movable portion, and a free end, the fixed end being held between the first fitting and the trailing edge, the cover portion extending upstream from the fixed end and across the interface, the movable portion located adjacent the aircraft exhaust deck;
   a spacing element engaging the movable portion and defining a gap for cooling air between the movable portion and the aircraft exhaust deck; and
   a tensioning element connected at a first end to the free end of the sheet and at a second end to the first fitting, the tensioning element providing tensioning force to keep the cover portion taut in the event that there is a change in interface size between the aircraft exhaust deck and the trailing edge.

2. The seal of claim 1, wherein the gap for cooling air has a constant width regardless of a distance between the aircraft exhaust deck and the trailing edge.

3. The seal assembly of claim 2, wherein the cover portion of the sheet is coplanar with the aircraft exhaust deck and the trailing edge.

4. The seal of claim 3, further comprising:
   a slot in the movable portion of the sheet.

5. The seal of claim 4, wherein the spacing element comprises a protrusion extending from the aircraft exhaust deck and through the slot in the movable portion of the sheet.

6. The seal assembly of claim 1, wherein the aircraft exhaust deck comprises metal and the trailing edge comprises ceramic.

7. A seal for bridging an interface between a first material and a second material, the seal comprising:
   a first fitting having a top and a downstream side, the downstream side in contact with the first material on a first side of the interface;
   a second fitting having a top and an upstream side, the upstream side adjacent to the second material on a second side of the interface;
   a spring located between the first fitting and the second fitting, the spring exerting an expansion force against both the first fitting and the second fitting so as to keep the first fitting in contact with the first material and the second fitting in contact with the second material to accommodate changes in interface size between the first material and the second material, the expansion force being balanced by a force exerted on the first fitting by the trailing edge and a force being exerted on the second fitting by the exhaust deck;
   a sheet having a fixed end, a cover portion, a movable portion, and a free end, the fixed end being held between the first fitting and the first material, the cover portion extending upstream from the fixed end and across the tops of both the first fitting and the second fitting to bridge the interface, the movable portion extending along the upstream side of the second fitting;
   a spacing element engaging the movable portion and defining a gap for cooling air between the movable portion and the second material; and
   a tensioning element connected at a first end to the free end of the sheet and at a second end to the first fitting, the tensioning element providing tensioning force to keep the cover portion taut if there is a change in interface size between the first material and the second material.

8. The seal of claim 7, further comprising:
   a tang attached to the downstream side of the first fitting; and
   a notch extending into the first material, wherein the tang is received into the notch.

9. The seal of claim 7, wherein the upstream side of the second fitting rotates.

10. The seal of claim 7, wherein the tops of the first fitting and the second fitting are coplanar.

11. A seal for bridging an interface between a first material and a second material, the seal comprising:
- a first fitting having a top and a downstream side contacting the first material on a first side of the interface;
- a second fitting including a support and a tube, the tube having a rotating engagement with a concave side of the support and contacting the second material on a second side of the interface;
- an expansion element located between the first fitting and the second fitting, the expansion element exerting an expansion force against both the first fitting and the second fitting to keep the first fitting in contact with the trailing edge and the second fitting in contact with the aircraft exhaust deck to accommodate changes in interface size between the first material and the second material, the expansion force being balanced by a force exerted on the first fitting by the trailing edge and a force being exerted on the second fitting by the exhaust deck;
- a sheet having a fixed end, a cover portion, a movable portion, and a free end, the fixed end pressed between the first fitting and the first material, the cover portion extending upstream from the fixed end across the tops of both the first fitting and the second fitting to bridge the interface, the movable portion extending along the upstream side of second fitting;
- a spacing element engaging the movable portion of the sheet and defining a gap for cooling air between the movable portion and the second material; and
- a tensioning element connected at a first end to the free end of the sheet and at a second end to the first fitting, the tensioning element providing tensioning force to keep the cover portion taut when the first material and second material move toward or away from one another.

12. The seal of claim 11, wherein the tensioning force exerted by the tensioning element is dominant over the expansion force exerted by the expansion element.

13. The seal of claim 11, wherein a first side of the tensioning element is fastened to the first fitting and a second side of the tensioning element extends through holes in the free end of the sheet.

14. The seal of claim 11, wherein the free end of the sheet has a thickness greater than the cover portion of the sheet.

15. The seal of claim 11, wherein the spacing element comprises stand-off feet extending downstream from the second material, each foot extending through one of a plurality of slots in the movable portion of the sheet.

* * * * *